B. H. PRATT.
VEHICLE TIRE.
APPLICATION FILED FEB. 5, 1921.
Reissued June 7, 1921. 15,121.
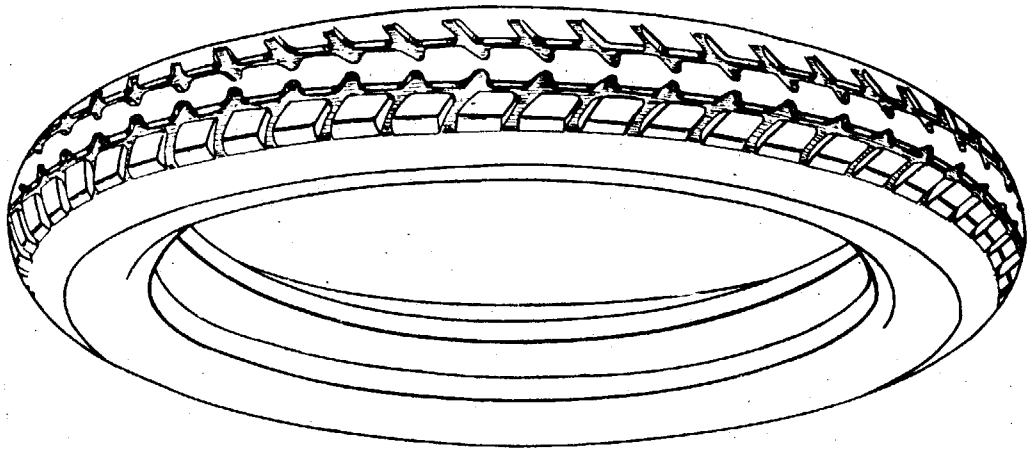
INVENTOR
Benjamin H. Pratt
BY
Hudley [illegible]
ATTORNEY

UNITED STATES PATENT OFFICE.

BENJAMIN H. PRATT, OF MILWAUKEE, WISCONSIN, ASSIGNOR TO THE FEDERAL RUBBER COMPANY, OF CUDAHY, WISCONSIN, A CORPORATION OF MASSACHUSETTS.

DESIGN FOR A VEHICLE-TIRE.

15,121. Specification for Reissued Design. Reissued June 7, 1921.

Original No. 52,116, dated June 18, 1918, Serial No. 208,525, filed December 22, 1917, for 3½ years. Application for reissue filed February 5, 1921. Serial No. 442,940. Term of patent 14 years.

*To all whom it may concern:*

Be it known that I, BENJAMIN H. PRATT, a citizen of the United States, residing at Milwaukee, in the county of Milwaukee and State of Wisconsin, United States of America, have invented a new, original, and ornamental Design for Vehicle-Tires, of which the following is a specification, reference being had to the accompanying drawing, whereof—

Figure 1 is a perspective view of a vehicle tire showing my new design.

I claim:

The ornamental design for a vehicle tire substantially as shown.

BENJAMIN H. PRATT.